US012756920B2

(12) United States Patent
Chu et al.

(10) Patent No.: US 12,756,920 B2
(45) Date of Patent: Oct. 6, 2026

(54) IMAGE SCALING DEVICE

(71) Applicant: ACULA TECHNOLOGY CORP., Taoyuan City (TW)

(72) Inventors: Yao-Wen Chu, Cerritos, CA (US); Mao-Hung Tu, Taoyuan City (TW)

(73) Assignee: ACULA TECHNOLOGY CORP., Taoyuan City (TW)

( * ) Notice: Subject to any disclaimer, the term of this patent is extended or adjusted under 35 U.S.C. 154(b) by 103 days.

(21) Appl. No.: 18/986,042

(22) Filed: Dec. 18, 2024

(65) Prior Publication Data

US 2025/0267353 A1 Aug. 21, 2025

(30) Foreign Application Priority Data

Feb. 20, 2024 (TW) ................................ 113106022

(51) Int. Cl.

*H04N 23/58* (2023.01)
*G03B 17/00* (2021.01)
*H04N 23/51* (2023.01)
*H04N 23/57* (2023.01)
*H04N 23/667* (2023.01)

(52) U.S. Cl.

CPC ............ *H04N 23/58* (2023.01); *H04N 23/51* (2023.01); *H04N 23/57* (2023.01); *H04N 23/667* (2023.01)

(58) Field of Classification Search

CPC ...... H04N 23/58; H04N 23/667; H04N 23/51; H04N 23/57; G03B 21/145
See application file for complete search history.

(56) References Cited

U.S. PATENT DOCUMENTS

2016/0309080 A1* 10/2016 Chu .................... G06V 40/161

* cited by examiner

*Primary Examiner* — Marly S Camargo
(74) *Attorney, Agent, or Firm* — RANKIN, HILL & CLARK LLP

(57) ABSTRACT

An image scaling device includes: a housing including a main body member and a handle member; a control unit in the housing and including an image capture module, a display module, an image processing module and a micro switch module, wherein the image capture module is configured for capturing an image, and the micro switch module is in the handle member and configured for generating a first signal and a second signal, so the image processing module processes the image according to the first signal or the second signal to reduce or enlarge the image, such that the image is displayed on the display module; and a rotation unit arranged around the handle member and being able to rotate along a first rotation direction or a second rotation direction relative to the handle member to trigger the micro switch module to generate the first signal or the second signal.

13 Claims, 5 Drawing Sheets

IMAGE SCALING DEVICE

BACKGROUND

1. Technical Field

The present disclosure relates to an image device, and more particularly, to an image scaling device.

2. Description of Related Art

Generally, in order to scale the image to meet the user's needs, the interpolation operation of the image can be performed by the controller in the display. In addition to software operation on the touch screen, the control method also has hardware operation. For example, in a conventional image scaling device, physical buttons for reducing or enlarging the image are placed near the screen. When using this conventional image scaling device, the user must hold the screen with one hand and adjust the physical buttons with the other hand, which is very inconvenient in operation.

SUMMARY

The present disclosure provides an image scaling device, which comprises: a housing including a main body member and a handle member, wherein the handle member extends outward from the main body member; a control unit located in the housing and including an image capture module, a display module, an image processing module and a micro switch module, wherein the image capture module is configured for capturing an image, and the micro switch module is located in the handle member and configured for generating a first signal and a second signal, so that the image processing module processes the image according to the first signal or the second signal to reduce or enlarge the image, such that the image is displayed on the display module; and a rotation unit arranged around the handle member and being able to rotate along a first rotation direction relative to the handle member to trigger the micro switch module to generate the first signal, and being able to rotate along a second rotation direction relative to the handle member to trigger the micro switch module to generate the second signal.

In the aforementioned image scaling device, the rotation unit includes a ring shell member, an accommodating space and a plurality of protrusions, wherein the accommodating space is surrounded and defined by the ring shell member and is provided for the handle member to pass through, and the plurality of protrusions are spaced apart from each other and extend outward from the ring shell member and are located in the accommodating space.

In the aforementioned image scaling device, the micro switch module is located in the accommodating space and has an operating lever, and the operating lever is able to move along a first direction and a second direction to generate the first signal and the second signal respectively.

In the aforementioned image scaling device, when the rotation unit rotates along the first rotation direction relative to the handle member, one of the plurality of protrusions pushes the operating lever to move along the first direction to generate the first signal, and when the rotation unit rotates along the second rotation direction relative to the handle member, another one of the plurality of protrusions pushes the operating lever to move along the second direction to generate the second signal.

In the aforementioned image scaling device, the first rotation direction is opposite to the second rotation direction, and the first direction is opposite to the second direction.

In the aforementioned image scaling device, the image scaling device further comprises a power supply unit, wherein the power supply unit is disposed in the handle member and used to supply power to the control unit.

In the aforementioned image scaling device, the image scaling device further comprises an interface module, wherein the interface module is disposed on the handle member and is electrically connected to the control unit and the power supply unit, and is used for external wiring to provide power to the control unit or charge the power supply unit.

In the aforementioned image scaling device, the main body member has a first side and a second side opposing the first side, wherein the image capture module is located in the main body member and exposed from the second side, and the display module is located in the main body member and exposed from the first side.

In the aforementioned image scaling device, the control unit further includes a lighting module, wherein the lighting module is located in the main body member and exposed from the second side, and is adjacent to the image capture module.

In the aforementioned image scaling device, the control unit further includes a switch member for controlling operations of the image capture module, the display module and the lighting module, wherein the switch member is located in the main body member and exposed from the first side, and is adjacent to the display module.

In the aforementioned image scaling device, the image scaling device further comprises a first protective member and a second protective member, wherein the first protective member covers the main body member and exposes the display module and the image capture module, and the second protective member covers the handle member.

In the aforementioned image scaling device, the first protective member and the second protective member are made of rubber.

To sum up, the image scaling device of the present disclosure can reduce and enlarge images with one hand, thereby solving the problem in the prior art that both hands must be used to achieve the same function. The image scaling device of the present disclosure has a simple structure, a small size, an easy portability and a convenient application.

DETAILED DESCRIPTION

Figure 1:
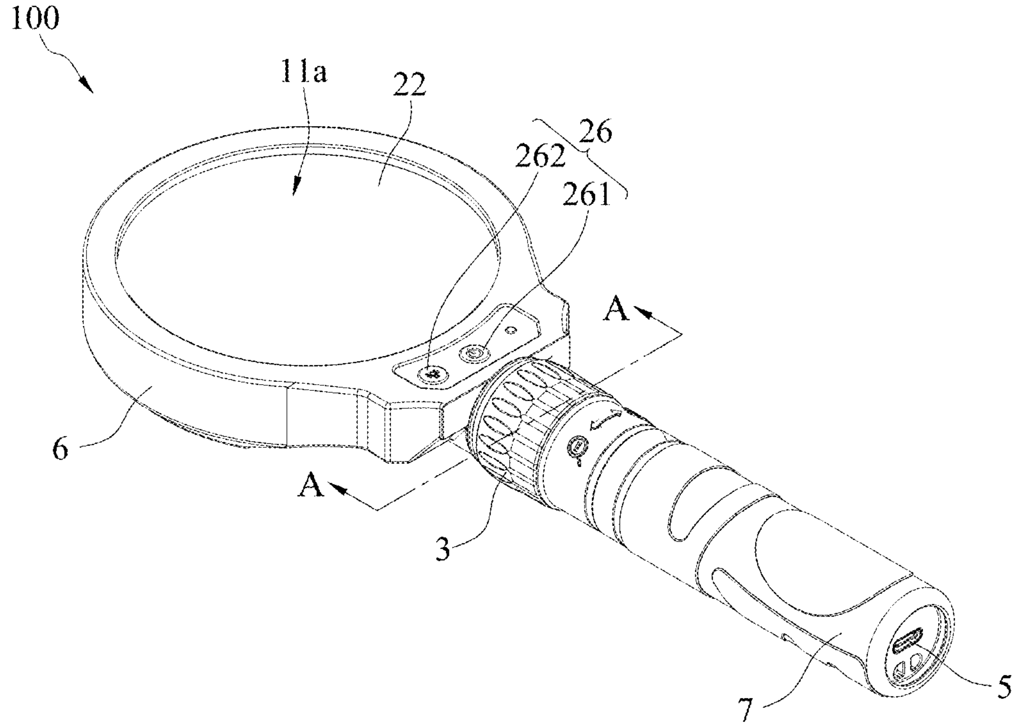
FIG. 1 is an overall schematic view of an image scaling device according to the present disclosure from one perspective.
Figure 2:
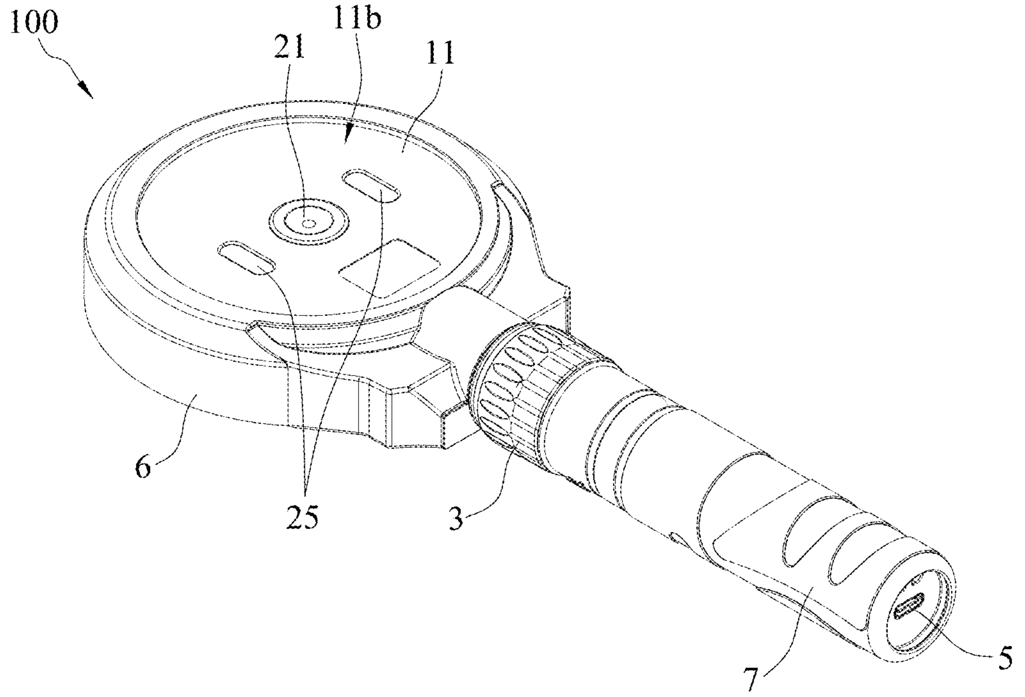
FIG. 2 is an overall schematic view of the image scaling device according to the present disclosure from another perspective.
Figure 3:
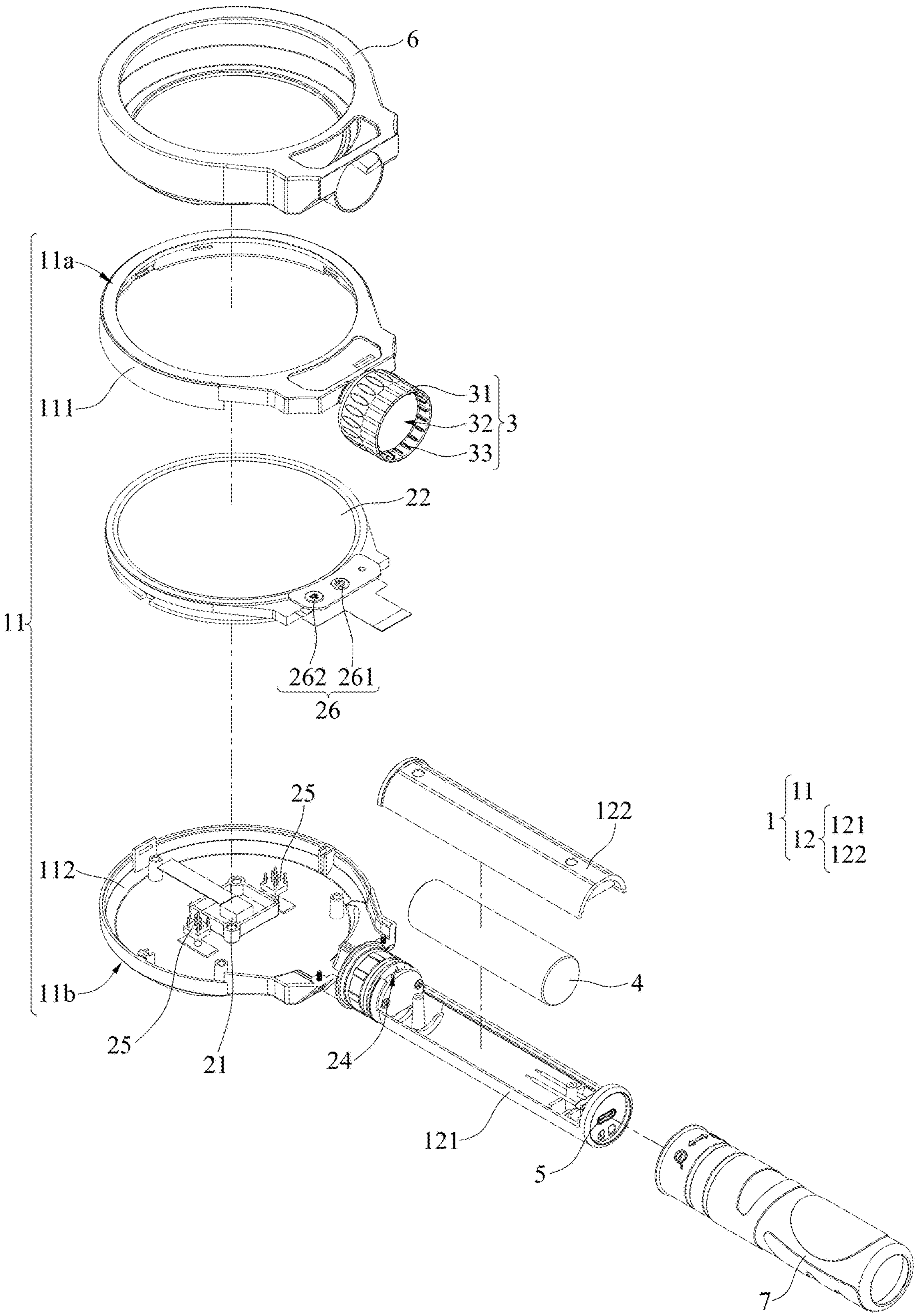
FIG. 3 is an exploded schematic view of the image scaling device according to the present disclosure.

The following describes the implementation of the present disclosure with examples. Those skilled in the art can easily understand other advantages and effects of the present disclosure from the contents disclosed in this specification, and can also implement or apply the present disclosure via other different specific embodiments.

Please refer to FIG. 1, FIG. 2, FIG. 3 and FIG. 5 at the same time. An image scaling device 100 of the present disclosure includes a housing 1, a control unit 2, a rotation unit 3, a power supply unit 4, an interface module 5, a first protective member 6 and a second protective member 7.

The housing 1 includes a main body member 11 and a handle member 12. The handle member 12 extends outward from the main body member 11. Specifically, the main body member 11 is roughly in the shape of a disk, which is composed of an upper shell 111 (such as an annular hollow shell) and a lower shell 112 assembled with each other, and has a first side 11*a* and a second side 11*b* opposing the first side 11*a*, wherein the first side 11*a* is defined by the upper shell 111 and the second side 11*b* is defined by the lower shell 112. The handle member 12 is roughly in the shape of a long strip and has an accommodating shell 121 and a cover shell 122 that can be assembled with each other. In one embodiment, the accommodating shell 121 extends outward from the lower shell 112 so that the lower shell 112 and the accommodating shell 121 are integrally formed, but the present disclosure is not limited to as such.

Figure 4:
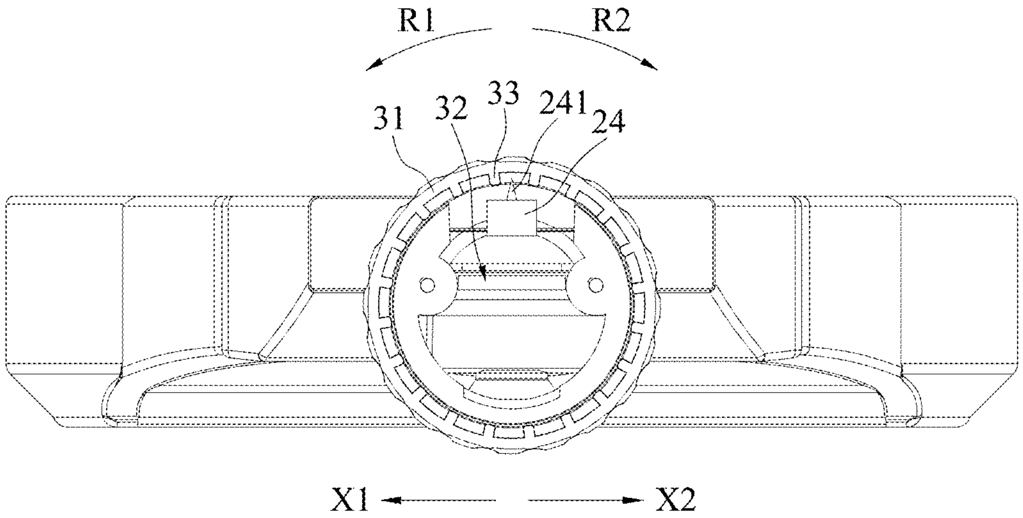
FIG. 4 is a schematic cross-sectional view along the line A-A in FIG. 1.
Figure 5:
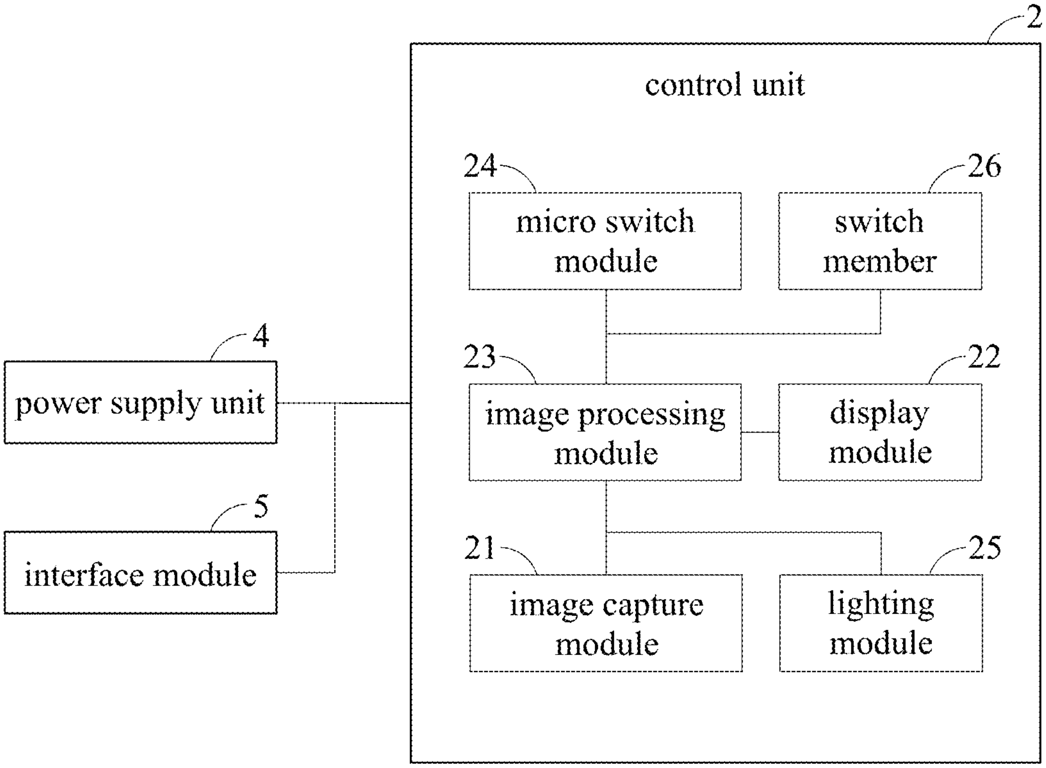
FIG. 5 is a system block diagram of a control unit in the image scaling device according to the present disclosure.

The control unit 2 is located in the housing 1 and includes an image capture module 21, a display module 22, an image processing module 23, a micro switch module 24, a lighting module 25 and a switch member 26 that are electrically connected to each other. The image capture module 21 is located in the main body member 11 and exposed from the second side 11*b*, and is used to capture images. The display module 22 is located in the main body member 11 and exposed from the first side 11*a*. Please refer to FIG. 4, the micro switch module 24 is located in the handle member 12 and has an operating lever 241. The operating lever 241 can move in a first direction X1 and a second direction X2 opposing the first direction X1 to generate a first signal and a second signal respectively. In one embodiment, the micro switch module 24 is a two-way push switch. By pressing the operating lever 241 to the left (the first direction X1) or right (the second direction X2), the two-way push switch generates an electrical conduction of the left or right circuit, thereby generating the first signal or the second signal. The image processing module 23 processes the image according to the first signal or the second signal to enlarge or reduce the image, and displays the processed image on the display module 22. The lighting module 25 is located in the main body member 11 and exposed from the second side 11*b*, and is adjacent to the image capture module 21, for providing light to the capture range of the image capture module 21. The switch member 26 is located in the main body member 11 and exposed from the first side 11*a*, and is adjacent to the display module 22. The switch member 26 has a power key 261 and a light key 262 spaced apart from each other. The power key 261 can control the operations of the image capture module 21 and the display module 22, and the light key 262 can control the operation of the lighting module 25.

In one embodiment, the image capture module 21 is a camcorder or a camera with a charge-coupled device (CCD) or a complementary metal-oxide semiconductor (CMOS), the display module 22 is a liquid crystal display (LCD) or other type of display device such as an organic light emitting diode (OLED), the image processing module 23 is a microprocessor, and the lighting module 25 is a light-emitting diode (LED), but the present disclosure is not limited to as such.

In one embodiment, the image processing module 23 may be provided with a jitter suppression or a compensation function, so that the image displayed by the display module 22 can be displayed stably and does not shake along with the image captured by the image capture module 21.

The rotation unit 3 includes a ring shell member 31, an accommodating space 32 and a plurality of protrusions 33. The ring shell member 31 is roughly in the form of a hollow annular body and is arranged around the handle member 12 and can rotate relative to the handle member 12 along a first rotation direction R1 and a second rotation direction R2 that are opposite to each other. The accommodating space 32 is surrounded and defined by the ring shell member 31 and is for the accommodating shell 121 of the handle member 12 to pass through and for the micro switch module 24 to be accommodated therein. The plurality of protrusions 33 are spaced apart from each other and extend outward from the ring shell member 31 and are located in the accommodating space 32. The power supply unit 4 is disposed in the handle member 12, specifically disposed in the accommodating shell 121 and covered by the cover shell 122, for supplying power to the control unit 2. The interface module 5 is provided at an end of the handle member 12 and is electrically connected to the control unit 2 and the power supply unit 4, and is used for external wiring to provide power to the control unit 2 or charge the power supply unit 4.

In one embodiment, the power supply unit 4 is a 18650 rechargeable lithium battery, and the interface module 5 is a Universal Serial Bus (USB) Type-C interface, but the present disclosure is not limited to as such.

The first protective member 6 is roughly in the form of a hollow annular body, used to cover the periphery of the main body member 11 and expose the display module 22 and the image capture module 21. The second protective member 7 is roughly in the shape of a hollow elongated body and is used to cover the handle member 12. In one embodiment, the first protective member 6 and the second protective member 7 are made of rubber, but the present disclosure is not limited to as such.

The usage of the image scaling device 100 of the present disclosure is as follows. The user can hold the handle member 12 (or the second protective member 7) with one hand and press the power key 261 with a finger (such as a thumb) to activate the image scaling device 100. At this time, the image captured by the image capture module 21 can be displayed on the display module 22 in real time. If the light is insufficient, the user can also press the light key 262 to provide light to the capture range of the image capture module 21. Then, the user can control the rotation unit 3 with a finger (such as the thumb). When the rotation unit 3 rotates along the first rotation direction R1 relative to the handle member 12, one of the plurality of protrusions 33 pushes the operating lever 241 to move along the first direction X1 to generate the first signal. The first signal allows the image processing module 23 to process the image captured by the image capture module 21, for example, reduce the image, and display the reduced image on the display module 22. When the rotation unit 3 rotates along the second rotation direction R2 relative to the handle member 12, the other one of the plurality of protrusions 33 pushes the operating lever 241 to move along the second direction X2 to generate the second signal. The second signal allows the image processing module 23 to process the image captured by the image capture module 21, for example, enlarge the image and display the enlarged image on the display module 22.

In summary, the image scaling device of the present disclosure can reduce and enlarge images with one hand, thereby solving the problem in the prior art that both hands must be used to achieve the same function. The image scaling device of the present disclosure has a simple structure, a small size, an easy portability and a convenient application.

The foregoing embodiments are provided for the purpose of illustrating the principles and effects of the present disclosure, rather than limiting the present disclosure. Anyone skilled in the art can modify and alter the above embodiments without departing from the spirit and scope of the present disclosure. However, any equivalent modifications and changes accomplished by applying the teachings of the present disclosure should still be covered by the following scope of the present disclosure. Therefore, the scope of protection with regard to the present disclosure should be as defined in the accompanying claims listed below.

What is claimed is:

1. An image scaling device, comprising:

a housing including a main body member and a handle member, wherein the handle member extends outward from the main body member;

a control unit located in the housing and including an image capture module, a display module, an image processing module and a micro switch module, wherein the image capture module is configured for capturing an image, and the micro switch module is located in the handle member and configured for generating a first signal and a second signal, so that the image processing module processes the image according to the first signal or the second signal to reduce or enlarge the image, so as to display the image reduced or enlarged by the image processing module on the display module; and a rotation unit arranged around the handle member and being able to rotate along a first rotation direction relative to the handle member to trigger the micro switch module to generate the first signal, and being able to rotate along a second rotation direction relative to the handle member to trigger the micro switch module to generate the second signal.

2. The image scaling device of claim 1, wherein the rotation unit includes a ring shell member, an accommodating space and a plurality of protrusions, wherein the accommodating space is surrounded and defined by the ring shell member and is provided for the handle member to pass through, and the plurality of protrusions are spaced apart from each other and extend outward from the ring shell member and are located in the accommodating space.

3. The image scaling device of claim 2, wherein the micro switch module is located in the accommodating space and has an operating lever, and the operating lever is able to move along a first direction and a second direction to generate the first signal and the second signal respectively.

4. The image scaling device of claim 3, wherein when the rotation unit rotates along the first rotation direction relative to the handle member, one of the plurality of protrusions pushes the operating lever to move along the first direction to generate the first signal, and when the rotation unit rotates along the second rotation direction relative to the handle member, another one of the plurality of protrusions pushes the operating lever to move along the second direction to generate the second signal.

5. The image scaling device of claim 4, wherein the first rotation direction is opposite to the second rotation direction, and the first direction is opposite to the second direction.

6. The image scaling device of claim 1, further comprising a power supply unit disposed in the handle member and used to supply power to the control unit.

7. The image scaling device of claim 6, further comprising an interface module, wherein the interface module is disposed on the handle member and is electrically connected to the control unit and the power supply unit, and is used for external wiring to provide power to the control unit or charge the power supply unit.

8. The image scaling device of claim 1, wherein the main body member has a first side and a second side opposing the first side, wherein the image capture module is located in the main body member and exposed from the second side, and the display module is located in the main body member and exposed from the first side.

9. The image scaling device of claim 8, wherein the control unit further includes a lighting module, located in the main body member, exposed from the second side, and adjacent to the image capture module.

10. The image scaling device of claim 9, wherein the control unit further includes a switch member for controlling operations of the image capture module, the display module and the lighting module, wherein the switch member is located in the main body member, exposed from the first side, and adjacent to the display module.

11. The image scaling device of claim 1, further comprising a first protective member and a second protective member, wherein the first protective member covers the main body member and exposes the display module and the image capture module, and the second protective member covers the handle member.

12. The image scaling device of claim 11, wherein the first protective member and the second protective member are made of rubber.

13. The image scaling device of claim 1, wherein the image processing module has a jitter suppression or a compensation function, so that the image displayed by the display module is displayed stably and does not shake along with the image captured by the image capture module.

* * * * *